United States Patent
Chen et al.

(10) Patent No.: US 11,923,690 B2
(45) Date of Patent: Mar. 5, 2024

(54) WIRELESS CHARGING APPARATUS AND METHOD

(71) Applicant: Huawei Technologies Co., Ltd., Shenzhen (CN)

(72) Inventors: Hongliang Chen, Fuzhou (CN); Wei Chen, Fuzhou (CN); Changsheng Pei, Dongguan (CN); Yongfa Zhu, Dongguan (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 724 days.

(21) Appl. No.: 16/951,883

(22) Filed: Nov. 18, 2020

(65) Prior Publication Data
US 2021/0075261 A1 Mar. 11, 2021

Related U.S. Application Data

(63) Continuation of application No. PCT/CN2019/081661, filed on Apr. 8, 2019.

(30) Foreign Application Priority Data

Jun. 26, 2018 (CN) .......................... 201810672235.3

(51) Int. Cl.
*H01M 10/44* (2006.01)
*H01M 10/46* (2006.01)
(Continued)

(52) U.S. Cl.
CPC ............ *H02J 50/12* (2016.02); *H02J 7/0047* (2013.01); *H02J 7/02* (2013.01); *H02J 50/40* (2016.02); *H02J 50/80* (2016.02); *H04B 1/3827* (2013.01)

(58) Field of Classification Search
CPC .. H02J 50/12; H02J 50/40; H02J 50/80; H02J 7/02; H02J 7/0047; H04B 1/3827
(Continued)

(56) References Cited

U.S. PATENT DOCUMENTS 8,299,753 B2 10/2012 Hui
9,843,217 B2 12/2017 Atasoy et al.
(Continued)

FOREIGN PATENT DOCUMENTS

CN 102017363 A 4/2011
CN 102349214 A 2/2012
(Continued)

OTHER PUBLICATIONS

Kuanmao et al.,"A Novel Transmitter Mechanism of Magnetic Resonance Wireless Power Array," Chinese Journal of Electron Devices, vol. 41, No. 1, total 5 pages (Feb. 2018). With an English Abstract.
(Continued)

*Primary Examiner* — Edward Tso
(74) *Attorney, Agent, or Firm* — Leydig, Voit & Mayer, Ltd.

(57) ABSTRACT

A wireless charging apparatus for a wireless power transmission system and a method are provided. The apparatus includes a voltage conversion circuit, an excitation coil, n first resonance coils, and a controller, where n is greater than or equal to 3. The voltage conversion circuit is connected to the excitation coil and converts a power grid voltage into a high-frequency alternating current voltage. The excitation coil generates a magnetic field based on the high-frequency alternating current voltage. The n first resonance coils are arranged in different directions and conducts the magnetic field, and the controller monitors power statuses of the first resonance coils, and enable or disable the first resonance coils based on the power statuses.

20 Claims, 11 Drawing Sheets

(51) Int. Cl.
*H02J 7/00* (2006.01)
*H02J 7/02* (2016.01)
*H02J 50/12* (2016.01)
*H02J 50/40* (2016.01)
*H02J 50/80* (2016.01)
*H04B 1/3827* (2015.01)

(58) Field of Classification Search
USPC .................. 320/107, 108, 132, 134, 136
See application file for complete search history.

(56) References Cited

U.S. PATENT DOCUMENTS

| | | |
|---|---|---|
| 2010/0289341 A1 | 11/2010 | Ozaki et al. |
| 2012/0244822 A1 | 9/2012 | Kim et al. |
| 2012/0248890 A1* | 10/2012 | Fukushima .............. B60L 53/30 |
| | | 307/104 |
| 2012/0319646 A1* | 12/2012 | Kamata .................. H02J 50/90 |
| | | 320/108 |
| 2013/0049480 A1 | 2/2013 | Tang |
| 2014/0049118 A1 | 2/2014 | Karalis et al. |
| 2017/0125161 A1 | 5/2017 | Teggatz et al. |
| 2017/0244286 A1 | 8/2017 | Bae |
| 2018/0034327 A1 | 2/2018 | Ren et al. |

FOREIGN PATENT DOCUMENTS

| | | |
|---|---|---|
| CN | 102005829 B | 7/2012 |
| CN | 102593964 A | 7/2012 |
| CN | 103378656 A | 10/2013 |
| CN | 104578452 A | 4/2015 |
| CN | 104600877 A | 5/2015 |
| CN | 104638773 A | 5/2015 |
| CN | 104969442 A | 10/2015 |
| CN | 104993614 A | 10/2015 |
| CN | 105207374 A | 12/2015 |
| CN | 206237211 U | 6/2017 |
| CN | 104617681 B | 7/2017 |
| CN | 107276249 A | 10/2017 |
| CN | 108092417 A | 5/2018 |
| CN | 109004768 A | 12/2018 |
| CN | 107343385 B | 7/2020 |
| JP | 3201863 U | 1/2016 |
| KR | 20170022420 A | 3/2017 |
| WO | 2016119100 A1 | 8/2016 |

OTHER PUBLICATIONS

Jadidian et al.,"Magnetic MIMO: How To Charge Your Phone in Your Pocket," MobiCom '14: Proceedings of the 20th annual international conference on Mobile computing and networking, pp. 495-506 (Sep. 2014).

Raval et al.,"Multiphase Inductive Power Transfer Box Based on a Rotating Magnetic Field," IEEE Transactions on Industrial Electronics, vol. 62, No. 2, pp. 795-802, Institute of Electrical and Electronics Engineers, New York, New York (Feb. 2015).

Choi et al., "Six Degrees of Freedom Mobile Inductive Power Transfer by Crossed Dipole Tx and Rx Coils," IEEE Transactions on Power Electronics, vol. 31, No. 4, pp. 3252-3272, Institute of Electrical and Electronics Engineers, New York, New York (Apr. 2016).

\* cited by examiner

WIRELESS CHARGING APPARATUS AND METHOD

CROSS-REFERENCE TO RELATED APPLICATIONS

This application is a continuation of International Application No. PCT/CN2019/081661, filed on Apr. 8, 2019, which claims priority to Chinese Patent Application No. 201810672235.3, filed on Jun. 26, 2018. The disclosure of the aforementioned application is hereby incorporated by reference in its entireties.

TECHNICAL FIELD

Embodiments of this application relate to wireless power transmission technologies.

BACKGROUND

Due to a requirement for convenient charging, a wireless charging technology by using which a data line is not required becomes increasingly important. Many domestic and foreign companies all work on wireless charging. For example, "plate-type wireless charging" developed by the Apple incorporation is a current mainstream wireless charging technology. By using this wireless charging technology, a low-power device such as a mobile phone or a smartwatch may be charged on a plate. However, because an induction blind area for a magnetic field exists in this design, omnidirectional charging cannot be implemented, and the device needs to be placed close to the charging plate. Therefore, like wired charging, the wireless charging in this design is very inconvenient. The charging is discontinued when there is a need to play a game or make a call. Therefore, the wireless charging capability under such wireless charging design is greatly limited.

For this purpose, some companies start research on omnidirectional wireless charging. In other words, wireless charging can be performed when the device is at any location. Currently, relatively representative companies include the WattUp, the PI, and the like. The WattUp has developed a WiFi-like wireless charging product. The wireless charging product can charge a surrounding device at a relatively long distance, and the charging is unrelated to a location. However, because a 5.6 GHz signal is used, an ideal power is only 4 W, and an actual working power is lower. Consequently, this solution is also greatly limited.

Disadvantages of the foregoing wireless charging solutions severely affect use experience of a consumer. Therefore, currently, there is an urgent need for a new solution in which a direction of a magnetic field can be adjusted in a system based on a location of the device, and omnidirectional wireless charging can be performed on an electronic device while a specific output power is also ensured.

SUMMARY

This application provides a wireless charging apparatus and method, to implement omnidirectional charging of a load by using a solution in which control is simple and power consumption is reduced.

According to one aspect, this application provides a wireless charging apparatus. The apparatus includes a voltage conversion circuit, an excitation coil, n first resonance coils, and a controller, where n is an integer greater than or equal to 3. The voltage conversion circuit is connected to the excitation coil and converts a power grid voltage into a high-frequency alternating current voltage required by the excitation coil. After receiving the high-frequency alternating current voltage from the voltage conversion circuit, the excitation coil generates a magnetic field according to the law of electromagnetic induction. The n first resonance coils are arranged in different directions and conduct the magnetic field. The controller monitors power statuses of the first resonance coils, and enables or disables the first resonance coils based on the power statuses. By using the foregoing design solution, charging can be implemented by supplying power to only one excitation coil. Power consumption is reduced when the foregoing design solution is compared with a solution in which power needs to be supplied to all coils. In addition, in the foregoing design solution, enabling or disabling of the first resonance coils may be controlled by monitoring the power statuses of the first resonance coils, to implement charging of loads in different directions in a simpler manner.

In a possible design, each first resonance coil and the excitation coil in the wireless charging apparatus further include a resonant capacitor. Each first resonance coil is connected to the resonant capacitor in series or in parallel to form a resonance circuit, and resonates under excitation of the excitation coil, to further enhance a conduction power of the first resonance coil to the magnetic field through the resonance.

In a possible design, each first resonance coil in the wireless charging apparatus is located on a path of the magnetic field generated by the excitation coil. In this design solution, a sufficient magnetic field passes through each first resonance coil in the magnetic field generated by the excitation coil, and each first resonance coil implements magnetic field conduction to a load by obtaining magnetic field energy of the excitation coil.

In a possible design, "n" of the "n" first resonance coils in the wireless charging apparatus is 3. In the three first resonance coils, a plane of any first resonance coil is arranged at an included angle of 120 degrees to a plane of a first resonance coil adjacent to the any first resonance coil. In the foregoing arrangement manner, the three first resonance coils can implement 360-degree omnidirectional charging of the load.

In a possible design, the controller in the wireless charging apparatus enables the first resonance coils one by one, compares powers of enabled first resonance coils, selects, as a first resonance coil that needs to be enabled, a first resonance coil with a maximum power that is not equal to "0", and sends an enabling instruction to the first resonance coil that needs to be enabled. By using this design, a location and a direction of the load are determined based on the powers of the conducted first resonance coils, to control a charging direction of the load. This is relatively simple.

In a possible design, in the wireless charging apparatus, the n first resonance coils may form 2n−1 resonance coil groups in a manner of a single coil or a combination of a plurality of first resonance coils. The controller enables the 2n−1 resonance coil groups one by one, compares powers of the resonance coil groups, selects, as a resonance coil group that needs to be enabled, a resonance coil group with a maximum power that is not equal to "0", and sends an enabling instruction to the resonance coil group that needs to be enabled. In the foregoing design, by increasing combination modes of the first resonance coils, a selection range of the resonance coil group with the maximum power is expanded, accuracy of controlling the charging direction is improved, and maximum power output to the load is implemented.

In a possible design, the wireless charging apparatus further includes a second resonance coil. The second resonance coil is in an enabled state, and is easier to absorb magnetic field energy of the excitation coil by being fully coupled to the excitation coil. The second resonance coil is connected to the first resonance coil and is weakly coupled to or uncoupled from the first resonance coil, to implement magnetic field conduction. In the foregoing solution design, a relay effect of the second resonance coil is enhanced, to implement more highly efficient power output and charge the load.

In a possible design, in the wireless charging apparatus, "n" of the "n" first resonance coils is 5. One first resonance coil is parallel to a plane of the excitation coil, and magnetic field conduction can be further enhanced by using the relay effect. Any one of the other four first resonance coils is arranged at an included angle of 90 degrees to a first resonance coil adjacent to the any one of the other four first resonance coils, to ensure 360-degree magnetic field conduction, that is, implement the omnidirectional charging of the load.

In a possible design, when it is determined that a power of the first resonance coil in the enabled state is lower than a threshold, the controller in the wireless charging apparatus may further send a disabling instruction to the first resonance coil. It indicates that the charged load moves, and an output power of the first resonance coil in the enabled state changes. Enabling the first resonance coil is not an optimal enabling solution. The first resonance coil in the enabled state needs to be disabled. The first resonance coil with a maximum power that is not equal to "0" is reselected and enabled. By using this design, a moving status of the load may be detected, the power statuses of the first resonance coils may be monitored again accordingly, and the first resonance coil with the maximum power is selected, to charge the load.

According to another aspect, this application provides a wireless charging method. The method is applied to a wireless charging apparatus. The wireless charging apparatus includes a voltage conversion circuit, an excitation coil, n first resonance coils, and a controller. The voltage conversion circuit is connected to the excitation coil. The n first resonance coils are arranged in different directions, where n is an integer greater than or equal to 3. The method includes: converting, by the voltage conversion circuit, a power grid voltage into a high-frequency alternating current voltage; generating, by the excitation coil, a magnetic field based on the high-frequency alternating current voltage; conducting, by the first resonance coils, the magnetic field; and monitoring, by the controller, power statuses of the first resonance coils, and enabling or disabling the first resonance coils based on the power statuses. In the method, a power output direction is controlled, and a load is charged by using a simple policy.

In a possible design, in the wireless charging method, the monitoring power statuses of the n first resonance coils, and controlling enabling or disabling of the first resonance coils based on the power statuses specifically includes: enabling the n first resonance coils one by one; comparing powers of enabled first resonance coils; and selecting and enabling a first resonance coil with a maximum power that is not equal to "0". In the method, the powers of the first resonance coils are compared to select the first resonance coil with a maximum power that is not equal to "0", to implement maximum power output to the load and improve charging efficiency.

In a possible design, the n first resonance coils form 2n−1 resonance coil groups in a manner of a single coil or a combination of a plurality of first resonance coils. In the wireless charging method, the monitoring power statuses of the n first resonance coils, and controlling enabling or disabling of the first resonance coils based on the power statuses specifically further includes: enabling the 2n−1 resonance coil groups one by one; comparing powers of the resonance coil groups; and selecting a resonance coil group with a maximum power that is not equal to "0". In the foregoing design, by increasing combination modes of the first resonance coils, a selection range of the resonance coil group with the maximum power is expanded, accuracy of controlling a charging direction is improved, and maximum power output to the load is implemented.

In a possible design, the wireless charging method further includes: receiving a power of the first resonance coil in an enabled state; and when the power of the first resonance coil in the enabled state is lower than a threshold, indicating that the load moves and the currently enabled first resonance coil is not a first resonance coil with a maximum power, and disabling the previously conducted first resonance coil. In the method, the power status of the first resonance coil in the enabled state is monitored, to adjust a selection and control solution in time and implement the maximum power output to the load.

In a possible design, in the wireless charging method, the threshold is designed to be 0.8 times the maximum power. When the power of the first resonance coil in the enabled state is lower than the threshold, it is determined that the load moves, to disable the first resonance coil. Magnetic field energy can be saved, and a first resonance coil with a larger output power can also be reselected, to ensure a charging power of the load.

In a possible design, in the wireless charging method, a second resonance coil in an enabled state is added, to enhance absorption of the magnetic field energy of the excitation coil; and may resonate with the first resonance coil under excitation of the excitation coil, to enhance magnetic field conduction efficiency.

DESCRIPTION OF EMBODIMENTS

It should be understood that although terms "first" and "second" are used in this specification to describe various types of components, these components are not limited by the terms. The terms are used only to distinguish between elements or components.

The terms used in the description of this application are merely for the purpose of illustrating specific embodiments, and are not intended to limit this application. The terms "said" and "the" of singular forms used in this specification and the appended claims of this application are also intended to include a case of "a plurality of", unless otherwise specified in the context clearly. It should also be understood that, the term "and/or" used in this specification indicates and includes any or all possible combinations of one or more associated listed items. It should be further understood that the term "include" used in this specification specifies presence of features, integers, steps, operations, elements, and/or components, with presence or attachment of other features, integers, steps, operations, elements, components, and/or their combinations not excluded.

An "excitation coil" used in the context of this application is a coil that generates magnetic field energy. Specifically, after receiving a high-frequency alternating current voltage from a voltage conversion circuit, the excitation coil generates the magnetic field energy according to the law of electromagnetic induction. A "resonance coil" used in the context of this application is a coil that transmits the magnetic field energy to a load. Specifically, the resonance coil receives a magnetic field energy generated by the excitation coil, transmits the magnetic field energy to the load, and causes resonance between the excitation coil and the resonance coil, to increase energy transmission and reduce an energy loss in a transmission process.

Figure 1:
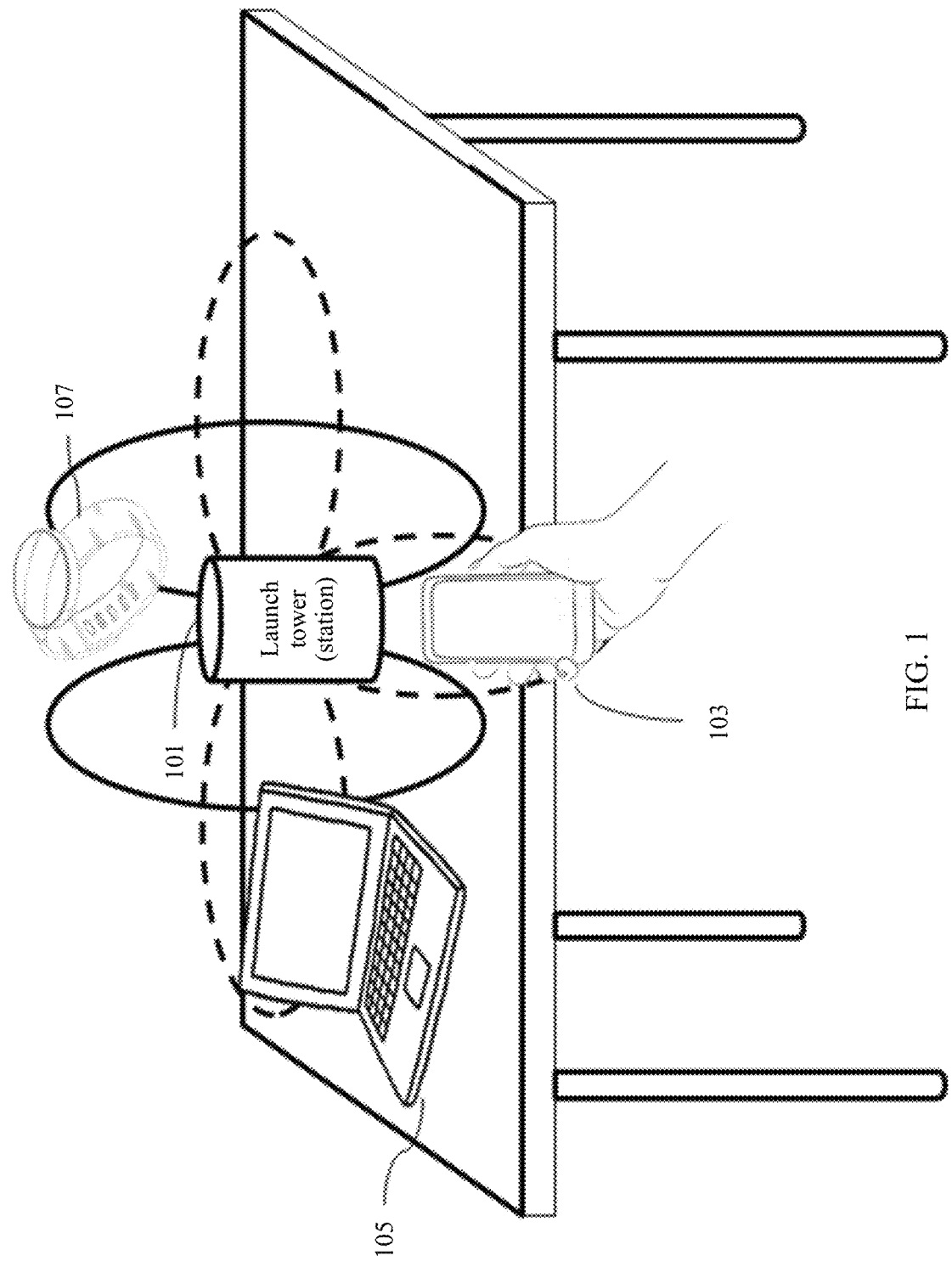
FIG. 1 is a schematic diagram of a possible application scenario of embodiments of this application.

An embodiment of this application provides a possible wireless charging apparatus. The apparatus is applicable to a series of situations such as a living room, a bedroom, a restaurant, a cafe, and a meeting room in which wireless charging is required. As shown in FIG. 1, a launch tower 101 is a wireless charging apparatus and can charge a device such as a mobile phone 103, a notebook computer 105, or a watch 107 that needs to be charged. Provided that a load is within a radiation range of a magnetic field, the launch tower 101 can wirelessly charge the load regardless of whether the load is in a static state or in a moving state.

Figure 2:
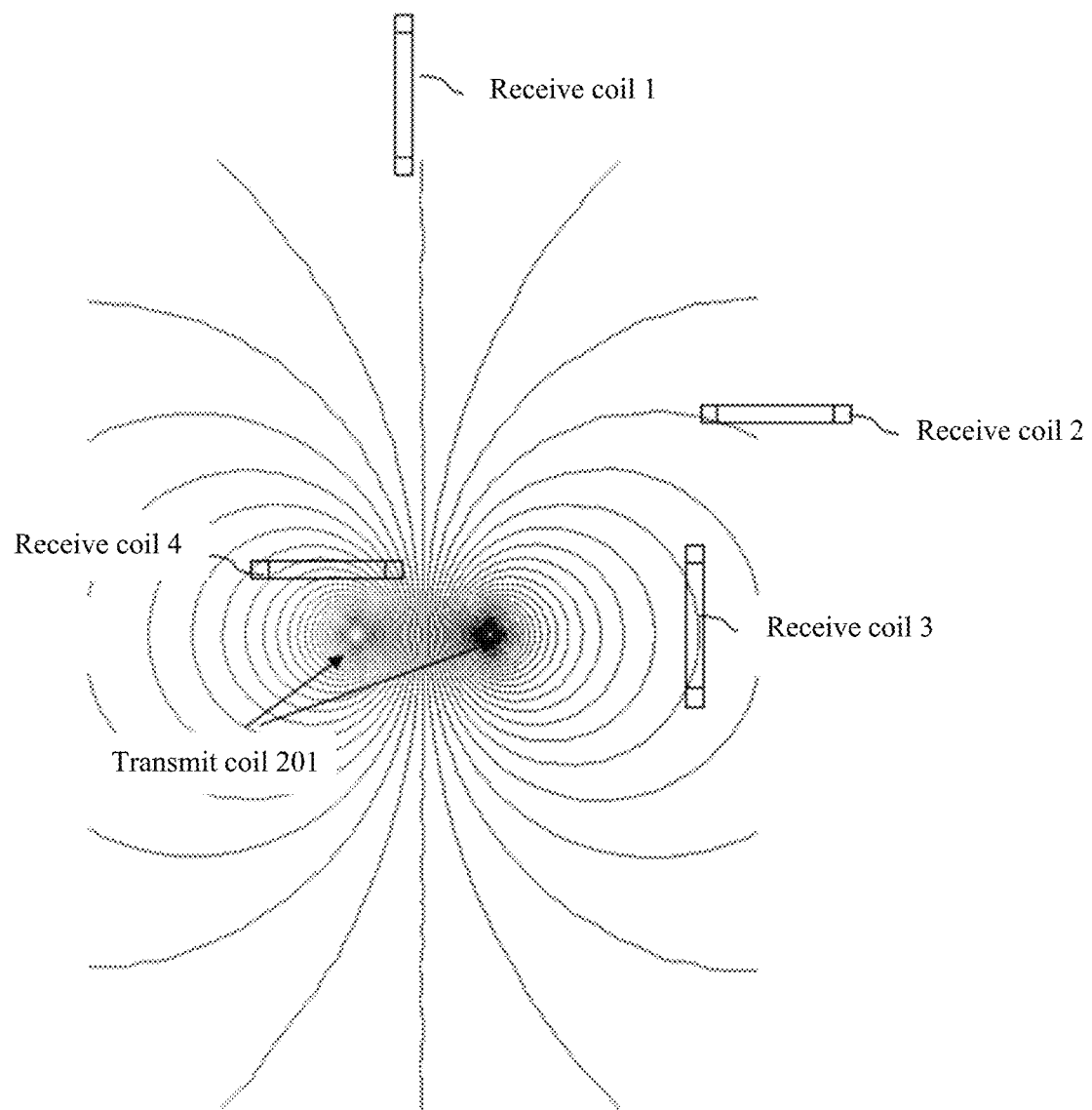
FIG. 2 is a diagram of a basic principle according to embodiments of this application.

As shown in FIG. 2, a technical principle of an embodiment of this application is provided.

A receive side coil of wireless charging needs to meet two requirements to receive energy from a transmit side coil: (1) A magnetic field is distributed at a location of the receive side coil, and the energy cannot be received if no magnetic field is distributed. (2) A magnetic field passes through the receive side coil. The energy from the transmit side coil also cannot be received if only the magnetic field is distributed and no magnetic field passes through the receive side coil. Wireless energy transmission can be implemented only when the foregoing two requirements are both met. The technical principle of this embodiment of this application is further described in FIG. 2. FIG. 2 is a top view of a transmit coil 201. Two poles in the middle indicate two ends of the transmit coil, coils 1, 2, 3, and 4 are receive coils, and mesh curves indicate a magnetic field generated when power is supplied to the transmit coil 201.

As shown in FIG. 2, the transmit coil 201 generates the magnetic field. The receive coils 1 and 2 are located within the magnetic field generated by the transmit coil. However, because the magnetic field does not pass through locations of the receive coils 1 and 2, an electric potential difference cannot be formed, causing a charging failure. Although the magnetic field passes through the receive coil 3, a magnetic field intensity of an equivalent magnetic field is zero because mutual cancellation occurs when the magnetic field passes through two poles of the coil. Therefore, an electric potential difference cannot be formed, causing a charging failure. The receive coil 4 is located within the magnetic field generated by the transmit coil, and the magnetic field passes through the receive coil 4, so that potential energy of the magnetic field can be converted into a current according to the law of electromagnetic induction.

Figure 2A:
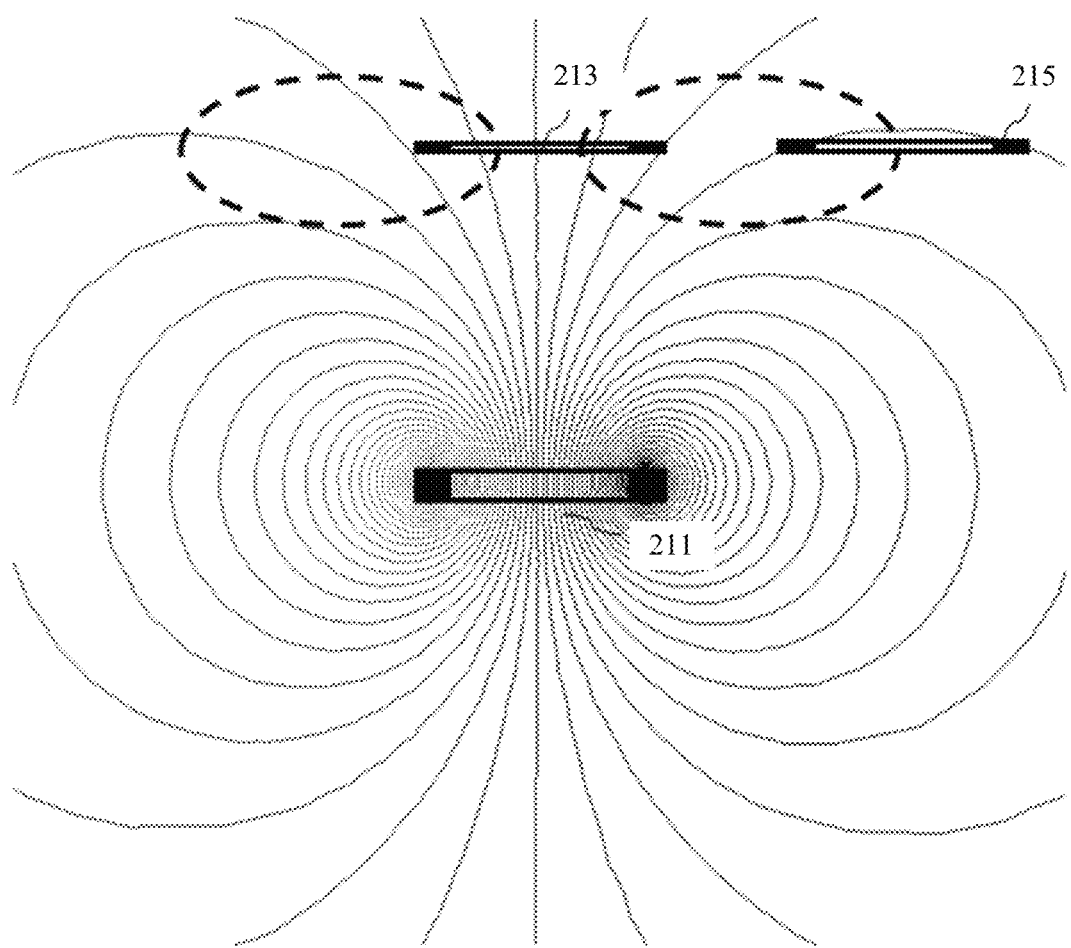
FIG. 2A is a schematic diagram of an embodiment according to this application.

FIG. 2A is a schematic diagram of an embodiment of this application. There is an excitation coil 211. This is the same as FIG. 2. In addition, a resonance coil 213 is further provided in FIG. 2A to play a relay effect. By using the resonance coil, a direction of a magnetic field is adjusted, and the magnetic field is enhanced, so that the magnetic field can pass through a receive coil 215. Further, three or more resonance coils may be provided in this embodiment of this application, and the excitation coil does not need to be physically connected to the resonance coil. The magnetic field is enhanced through resonance between a plurality of resonance coils. The magnetic field can be directed to different directions by controlling enabling and disabling of each resonance coil by using an algorithm. Compared with the prior art, this application can not only implement charging in any direction, but also implements relatively simple control and reduces development costs.

Figure 3:
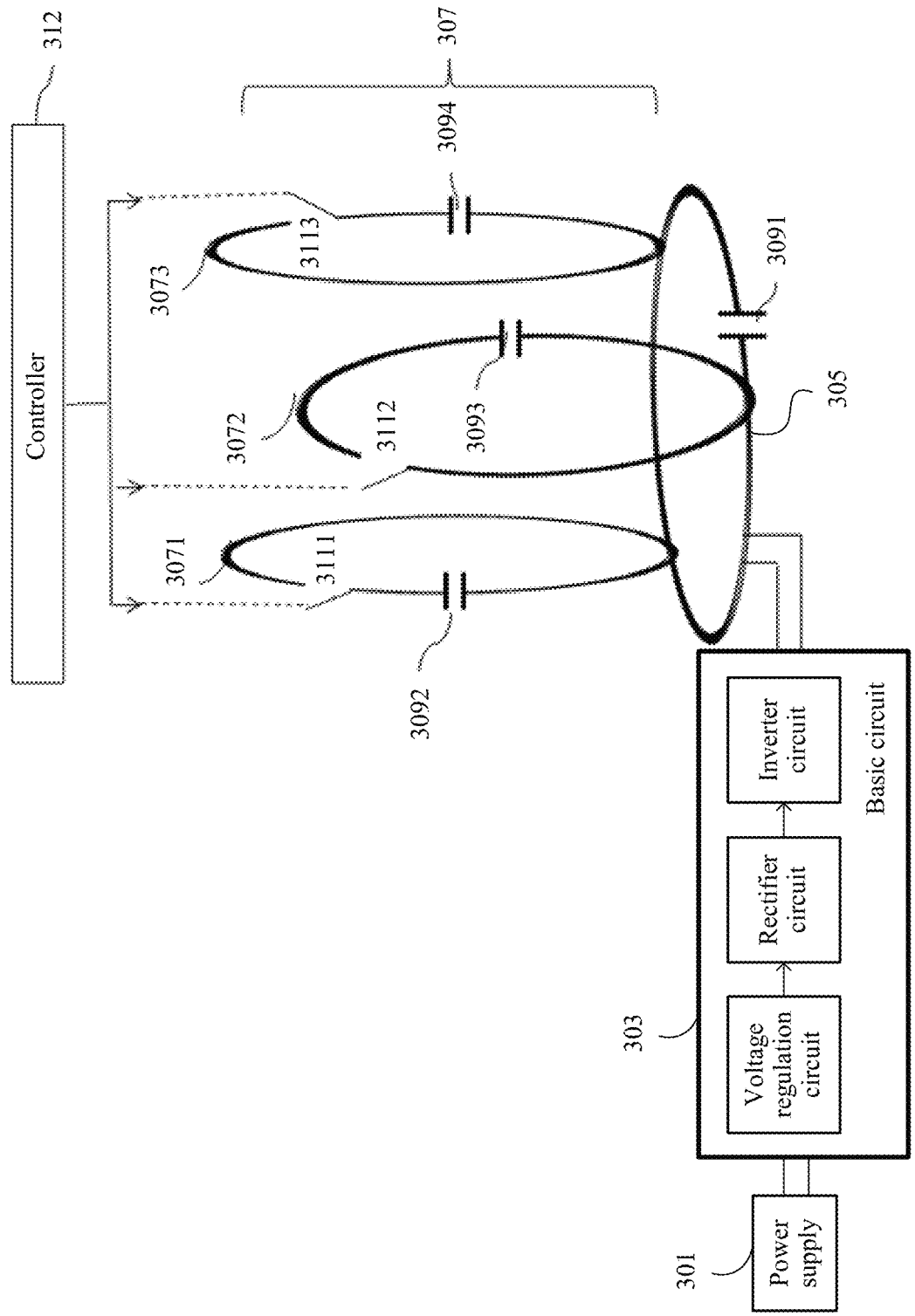
FIG. 3 is a schematic diagram A of a possible wireless charging apparatus according to embodiments of this application.

An embodiment shown in FIG. 3 provides a wireless charging apparatus. The apparatus includes a power supply 301, a basic circuit 303, an excitation coil 305, n first resonance coils 307, and a controller 312.

The basic circuit 303 specifically further includes a voltage regulation circuit, a rectifier circuit, and an inverter circuit. The voltage regulation circuit performs voltage step down processing on a 220V/50 Hz power grid voltage from the power supply 301, and a voltage step down amplitude is related to an output power and a system design. A common terminal device is used as an example. Because the output power is between several watts and several dozens of watts, the power grid voltage may be stepped down to several dozens of volts, for example, 30 volts. An actual output power is also related to a current. When a voltage is constant, a magnitude of the current depends on the system design, a design of a receive device, and a distance between a transmit coil and a receive coil. After the voltage step down processing, the rectifier circuit converts, into a direct current voltage, an alternating current voltage obtained after the voltage step down processing, and the inverter circuit converts the direct current voltage into a high-frequency alternating current voltage to be supplied to the excitation coil 305. A frequency of the high-frequency alternating current voltage herein is usually between several dozens of kHz and several MHz, for example, 100 kHz and an ISM frequency band of 6.765 MHz to 6.795 MHz. However, this is not limited to this frequency.

Figure 3A:
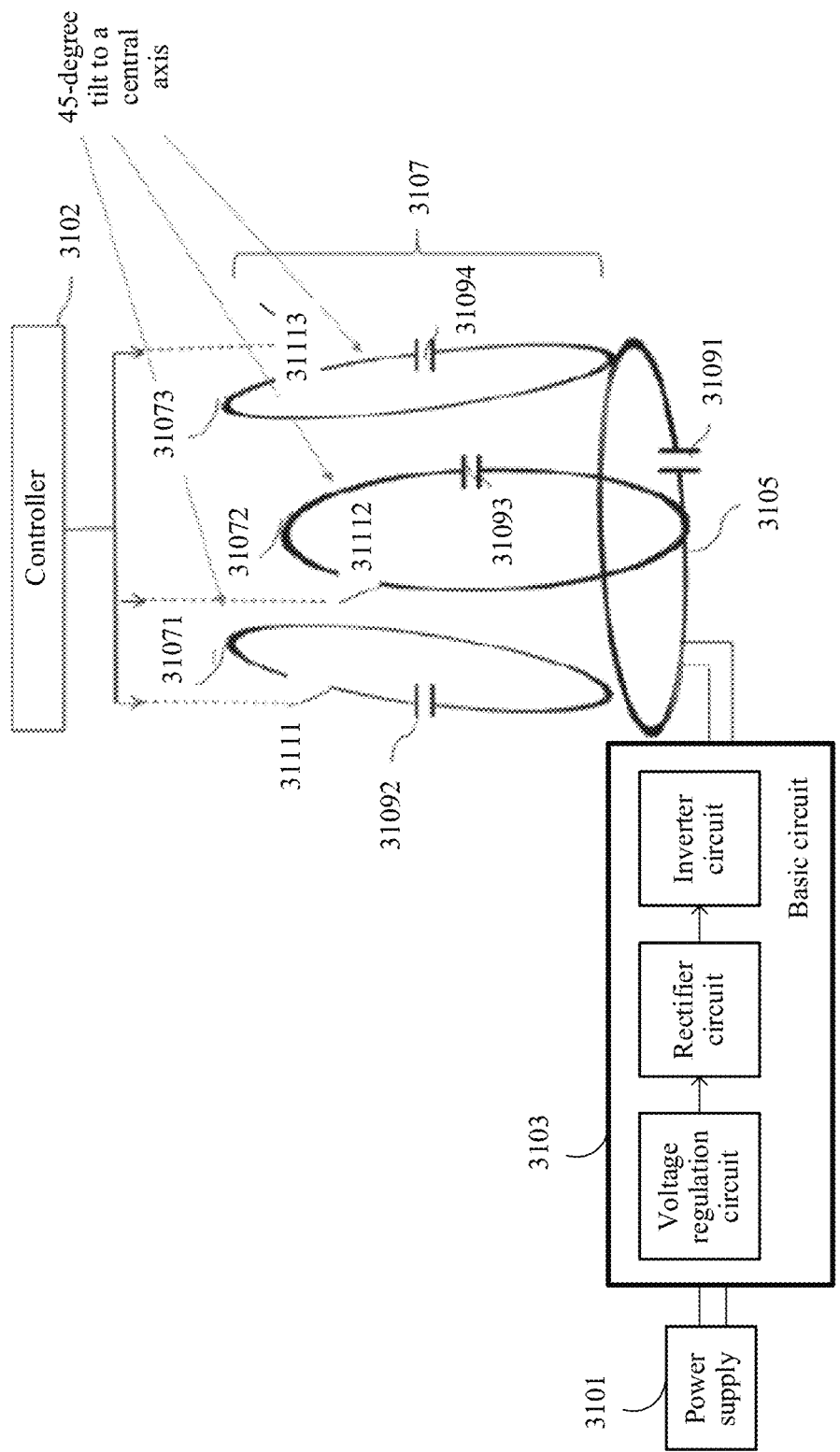
FIG. 3A is a schematic diagram A-1 of a possible wireless charging apparatus according to embodiments of this application.
Figure 3B:
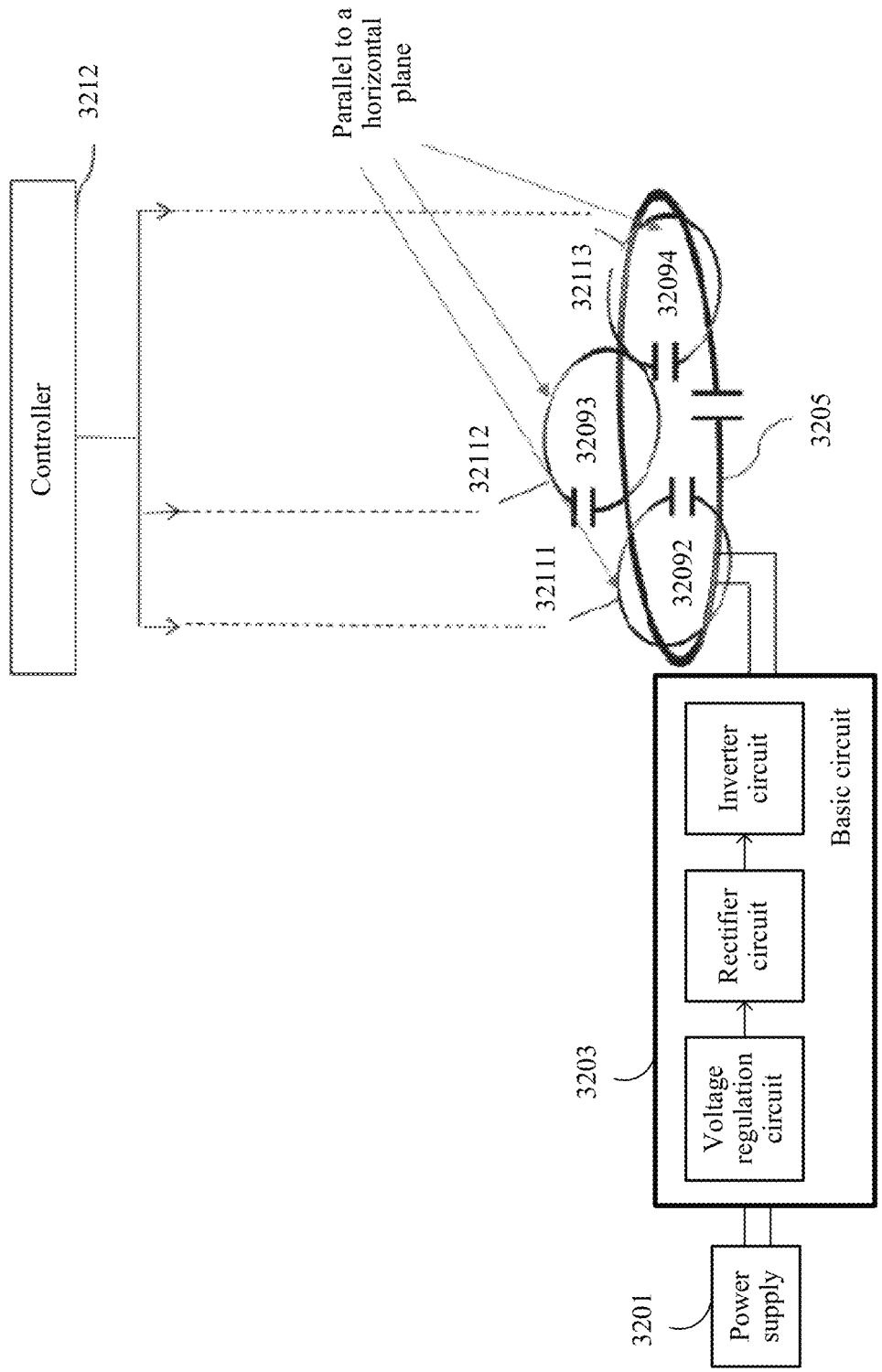
FIG. 3B is a schematic diagram A-2 of a possible wireless charging apparatus according to embodiments of this application.

After receiving the high-frequency alternating current voltage from the basic circuit, the excitation coil 305 generates a magnetic field according to the law of electromagnetic induction. The excitation coil 305 is further connected to a resonant capacitor 3091 in series and is configured to generate resonance with the n first resonance coils 307. The n first resonance coils 307 include three first resonance coils 3071, 3072, and 3073. The three first resonance coils are located on a path of the magnetic field generated by the excitation coil 305, and are relatively strong in coupling, to implement 360-degree omnidirectional charging. For example, the three first resonance coils 3071, 3072, and 3073 are separately located at an edge of the excitation coil, and any one of the three resonance coils has an included angle of 120 degrees to a resonance coil adjacent to the any one of the three resonance coils, so that the magnetic field generated by the excitation coil 305 may be separately conducted in different directions. It should be noted that a direction of each of the three first resonance coils may be arranged at a specific angle to a horizontal plane. The specific angle includes but is not limited to 90 degrees, 60 degrees, 45 degrees, 30 degrees, 15 degrees, or any angle between 0 and 90 degrees. As shown in FIG. 3A, a magnetic field intensity in different directions may be further enhanced by using an arrangement manner in which directions of three first resonance coils 31071, 31072, and 31073 are arranged at an angle of 45 degrees to the horizontal plane. Optionally, as shown in FIG. 3B, directions of three first resonance coils 32111, 32112, and 32113 are arranged at an angle of 0 degrees to the horizontal plane, and the three first resonance coils 32111, 32112, and 32113 are located on a path of a magnetic field generated by an excitation coil 3205, to implement magnetic field conduction in different directions.

As shown in FIG. 3, the three first resonance coils 3071, 3072, and 3073 are further connected to switches 3111, 3112, and 3113 respectively in series. The switch is opened or closed by receiving an instruction from the controller 312, to disable or enable the first resonance coil. It should be noted that, when a charged load is charged, a first resonance coil most corresponding to a location of the charged load may be enabled. In this case, the first resonance coil most corresponding to the location of the charged load may be a first resonance coil with a maximum power after the first resonance coil is enabled. Alternatively, any combination of two or more first resonance coils may be selected and enabled. In this case, the resonance coil most corresponding to the location may be any combination of first resonance coils with a maximum power after any combination of the first resonance coils is enabled.

Optionally, as shown in FIG. 3, the excitation coil 305 is connected to the resonant capacitor 3091 in series or in parallel. The three first resonance coils 3071, 3072, and 3073 are respectively connected to resonant capacitors 3092, 3093, and 3094 in series or in parallel. The resonant capacitor can enable a first resonance coil corresponding to the resonant capacitor to operate in a resonant state, thereby increasing a magnetic field transmission power. Specifically, resonance means that resonance occurs between an inductor and a capacitor at a resonance frequency. A coil is equivalent to an inductor. Four resonant capacitors 3091, 3092, 3093, and 3094 are respectively connected to the excitation coil 305 and the three first resonance coils 3071, 3072, and 3073 in series or in parallel, so that the three first resonance coils resonate at a current frequency of the excitation coil.

As shown in FIG. 3, the controller 312 controls enabling or disabling of the first resonance coils by using the switches 3111, 3112, and 3113 based on power statuses of the three first resonance coils 3071, 3072, and 3073. The controller 312 may be a processor such as a CPU or a unit machine configured to execute a software instruction, and reads a program to perform a corresponding operation. In addition, the controller may further be an FPGA chip, and performs a corresponding operation by reading a configuration file in a memory. Alternatively, the controller may also be implemented based on an ASIC. Regardless of hardware on which the controller is based, the controller can complete a corresponding control function. The control function may be specifically: enabling the three first resonance coils one by one, and obtaining powers P1, P2, and P3 after the three first resonance coils 3071, 3072, and 3073 are enabled; obtaining a maximum power value in P1, P2, and P3 through an internal operation, determining that the maximum power value is not equal to zero, and determining that the first resonance coil is a first resonance coil that needs to be enabled; and sending a switch close instruction to the first resonance coil that needs to be enabled. In other words, the coil is enabled by using the switch close instruction. For example, through the foregoing operation, it is found that the maximum power that is not equal to zero is P3, and P3 is an output power of the first resonance coil 3073. In this case, the first resonance coil 3073 is enabled.

Optionally, the controller 312 may further implement the following control function: detecting periodically or in real time a power of the first resonance coil that has been enabled; comparing the power with a pre-stored threshold; and if the power is less than or equal to the threshold, sending a switch open instruction to the first resonance coil. Specifically, the coil is disabled by using the switch open instruction. If the power is greater than the threshold, the controller 312 does not need to send an instruction for changing an enabled/a disabled state of the resonance coil, and maintains enabling of the first resonance coil.

It should be noted that the powers P1, P2, and P3 of the three first resonance coils 3071, 3072, and 3073 after being enabled may be obtained in the following manner. For example, the excitation coil generates the magnetic field, the resonance coils conduct the magnetic field, and the magnetic field radiates into air. After capturing the magnetic field, a receive coil generates an electric potential difference, obtains power data, and transmits the power data to the controller on a transmit side in a wireless communication manner.

It should be noted that, in another possible implementation, the n first resonance coils may form 2n−1 resonance coil groups in a manner of a single coil or a combination of a plurality of first resonance coils. The controller may further perform controlling based on the resonance coil group. The controlling may be specifically: enabling the 2n−1 resonance coil groups one by one, comparing powers of the resonance coil groups, selecting, as a resonance coil group that needs to be enabled, a resonance coil group with a maximum power that is not equal to "0", and sending an enabling instruction to the resonance coil group that needs to be enabled. Specifically, as shown in FIG. 3, the three first resonance coils may form resonance coil groups in a manner of a single coil or a combination of a plurality of first resonance coils, and there may be 2³−1 types, that is, seven combination modes: 3071, 3072, 3073, "3071 and 3072", "3071 and 3073", "3072 and 3073", and "3071, 3072, and 3073" respectively. The controller 312 obtains powers P1, P2, P3, P4, P5, P6, and P7 after the seven combination modes of resonance coils are enabled, obtains a maximum power value in P1, P2, P3, P4, P5, P6, and P7 through an internal operation, determines that the maximum power value is not equal to zero, and sends an enabling instruction to a combination mode of the first resonance coils with a maximum power. For example, if it is obtained through measurement that an output power P4 of a resonance coil combination "3071 and 3072" is the largest and not equal to zero, the resonance coils 3071 and 3072 are enabled by sending a switch close instruction to the resonance coils "3071 and 3072".

Alternatively, the controller 312 may further detect periodically or in real time a power of any combination of the first resonance coils that have been conducted; and when the power of the any combination of the first resonance coils is lower than the threshold, send a switch open instruction to the any combination of the first resonance coils, that is, disable the any combination of the first resonance coils. Specifically, the controller 312 obtains the power of the any combination of the first resonance coils that have been enabled; compares the obtained power with the pre-stored threshold; and if the power is less than or equal to the threshold, sends a disabling instruction to the any combination of the first resonance coils, that is, sends an open instruction to a switch of the any combination of the first resonance coils; or if the power is greater than the threshold, does not need to send an instruction for changing an enabled/a disabled state of the any combination of the first resonance coils, and maintains enabling of the any combination of the first resonance coils. For example, the any combination of the first resonance coils that have been enabled is the first resonance coils "3071 and 3072". When a power of the first resonance coils "3071 and 3072" is less than or equal to the threshold, a disabling instruction is sent to the first resonance coil 3071 and the first resonance coil 3072, that is, switches of the first resonance coils 3071 and 3072 are opened.

Figure 4:
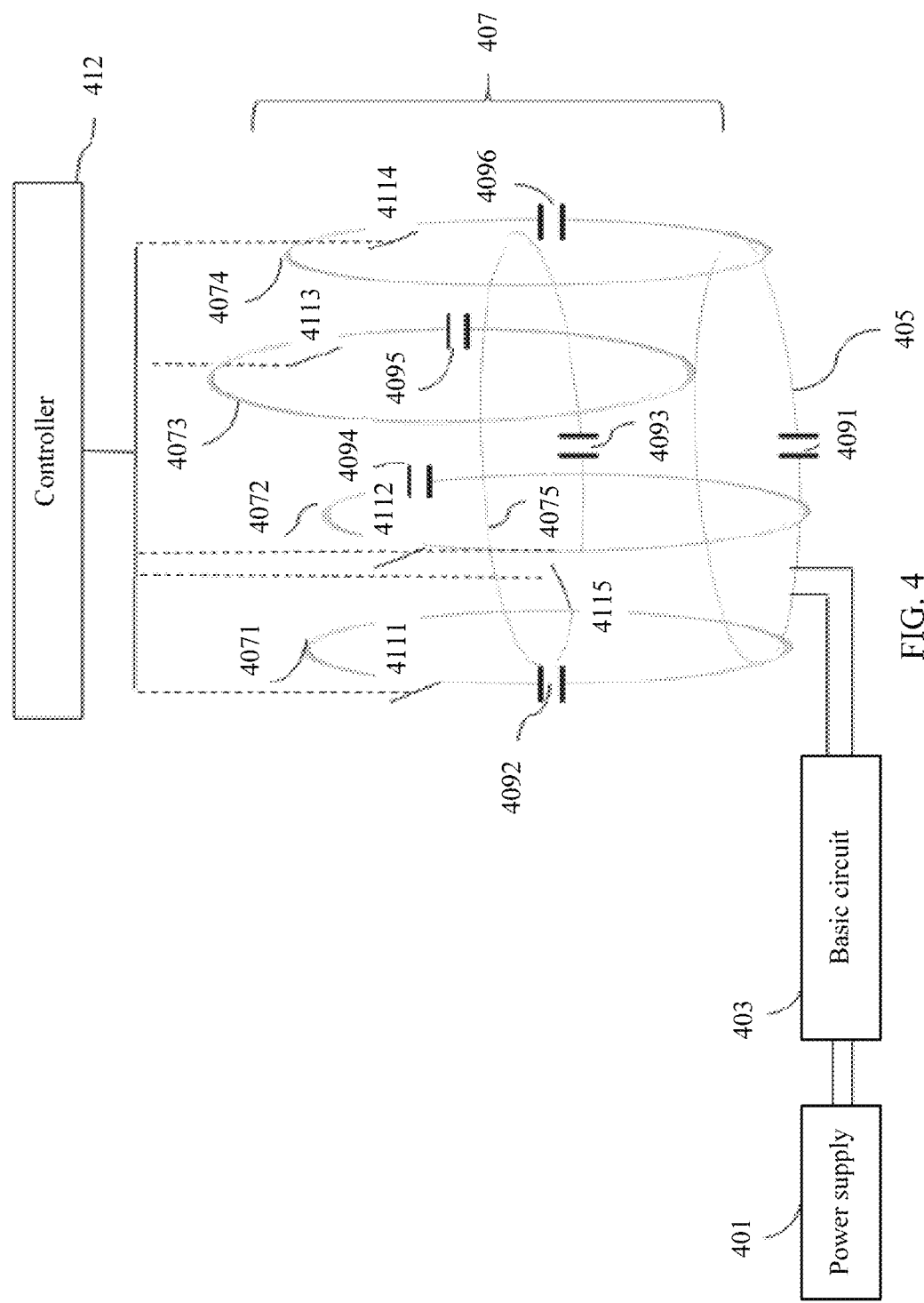
FIG. 4 is a schematic diagram B of a possible wireless charging apparatus according to embodiments of this application.

As shown in FIG. 4, another embodiment of this application provides a possible implementation of a wireless charging apparatus. The apparatus includes a power supply 401, a basic circuit 403, an excitation coil 405, a resonance coil group 407, and a controller 412. The power supply 401, the basic circuit 403, the excitation coil 405, and the controller 412 are the same as the power supply 301, the basic circuit 303, and the excitation coil 305 shown in FIG. 3. The resonance coil group 407 includes five first resonance coils 4071, 4072, 4073, 4074, and 4075. This is different from FIG. 3. The five first resonance coils are relatively strongly coupled to the excitation coil 405, to implement 360-degree omnidirectional charging. For example, the four first resonance coils 4071, 4072, 4073, and 4074 are separately located at an edge of the excitation coil and are distributed vertically to the excitation coil, and any one of the four first resonance coils is arranged at an included angle of 90 degrees to a first resonance coil adjacent to the any one of the four first resonance coils. In this way, a magnetic field generated by the excitation coil 405 may be separately conducted in different directions. The first resonance coil 4075 is arranged in parallel with the excitation coil 405, to increase a degree of freedom of the magnetic field in radiating in a vertical direction and project the magnetic field in more directions.

The first resonance coils 4071, 4072, 4073, 4074, and 4075 are further connected to switches 4111, 4112, 4113, 4114, and 4115 respectively in series. The switch is opened or closed by receiving an instruction from the controller 412, to disable or enable the resonance coil. It should be noted that, when a charged load is charged, a first resonance coil most corresponding to a location of the charged load may be enabled. In this case, the resonance coil most corresponding to the location of the charged load may be a first resonance coil with a maximum power after the coil is enabled. Alternatively, any combination of two or more first resonance coils may be selected and enabled. In this case, the first resonance coil most corresponding to the location may be any combination of first resonance coils with a maximum power after any combination of the first resonance coils is enabled.

Optionally, the first resonance coils 4071, 4072, 4073, 4074, and 4075 are respectively connected to resonant capacitors 4092, 4093, 4094, 4095, and 4096 in series or in parallel, and the excitation coil 405 is connected to a resonant capacitor 4091 in series or in parallel. The resonant capacitor can enable a first resonance coil corresponding to the resonant capacitor to operate in a resonant state, thereby increasing a magnetic field transmission power. Specifically, resonance means that resonance occurs between an inductor and a capacitor at a resonance frequency. A coil is equivalent to an inductor. Six resonant capacitors 4091, 4092, 4093, 4094, 4095, and 4096 are respectively connected to the excitation coil 405 and the five first resonance coils 4071, 4072, 4073, 4074, and 4075 in series or in parallel, so that the five first resonance coils resonate at a current frequency of the excitation coil.

It should be noted that examples of three first resonance coils and five first resonance coils are shown in the embodiments of FIG. 3 and FIG. 4, but a quantity of first resonance coils is not limited to three or five provided that the quantity can be more than or equal to three. For example, there may be four first resonance coils. In this case, an arrangement angle thereof is correspondingly adjusted, for example, may be an included angle of 90 degrees between any two adjacent first resonance coils. Alternatively, the first resonance coils may be arranged in another direction. An increase in the quantity of first resonance coils causes more combination modes of the first resonance coils. An example of another different quantity of first resonance coils may be obtained by analogy based on the descriptions of the two embodiments that have been provided, and details are not described herein again.

Figure 8:
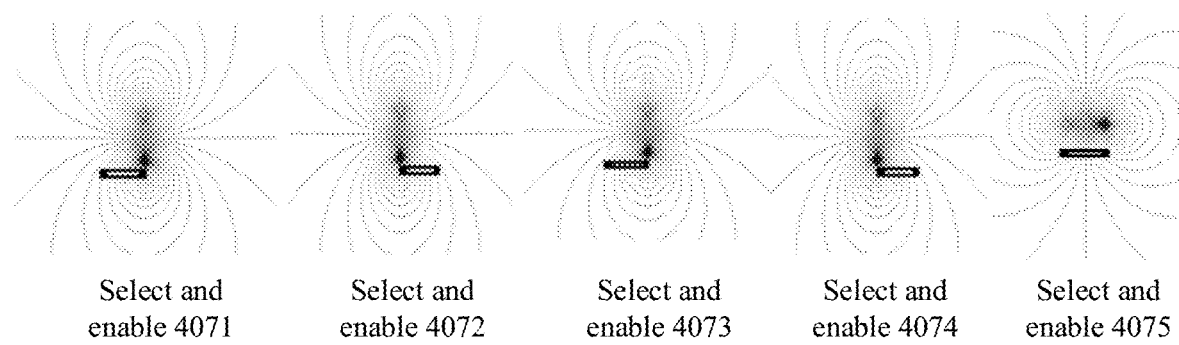
FIG. 8 is a beneficial effect drawing A according to embodiments of this application.

FIG. 8 shows a simulation result of a magnetic field distribution status on a transmit side in this embodiment. It can be learned that a magnetic field intensity is relatively large after the first resonance coils 4071, 4072, 4073, 4074, and 4075 are separately enabled, and magnetic field distribution in different directions can be implemented by enabling the first resonance coils at different locations, to implement omnidirectional wireless charging.

Figure 5:
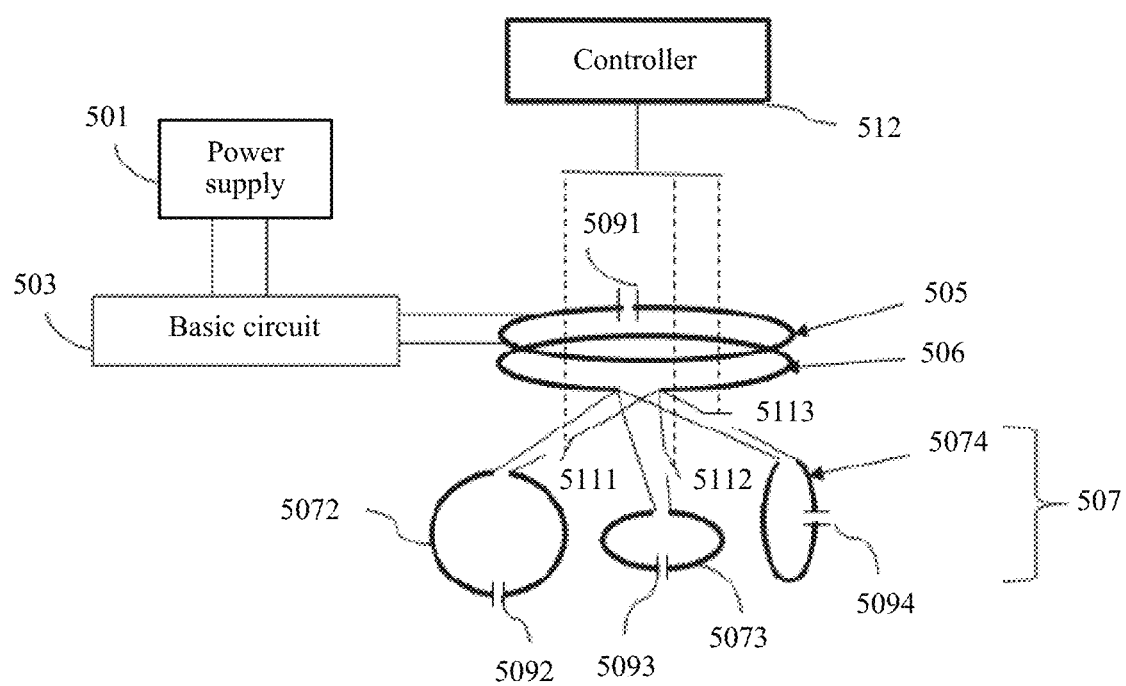
FIG. 5 is a schematic diagram C of a possible wireless charging apparatus according to embodiments of this application.

As shown in FIG. 5, another possible embodiment of this application provides a possible implementation of a wireless charging apparatus. The apparatus includes a power supply 501, a basic circuit 503, an excitation coil 505, a first resonance coil 507, a second resonance coil 506, and a controller 512. The power supply 501, the basic circuit 503, the excitation coil 505, and the controller 512 are the same as the power supply 301, the basic circuit 303, and the excitation coil 305 shown in FIG. 3. The second resonance coil 506 is added. This is different from FIG. 3. The second resonance coil 506 is fully coupled to the excitation coil 505 and is physically connected to three first resonance coils 5072, 5073, and 5074. The three first resonance coils are weakly coupled to or uncoupled from the excitation coil, to implement 360-degree omnidirectional charging and enhance a magnetic field propagation power. For example, the second resonance coil 506 is close to the excitation coil 505 to implement full coupling, to increase a power of a magnetic field generated by the excitation coil 505 and conduct the magnetic field. The first resonance coils 5072, 5073, and 5074 are physically connected to the second resonance coil 506, and an included angle of 120 degrees exists between any two first resonance coils, so that the magnetic field conducted by the second resonance coil 506 can be separately conducted in different directions.

The first resonance coils 5072, 5073, and 5074 are further connected to switches 5111, 5112, and 5113 respectively in series. The switch is opened or closed by receiving an instruction from the controller 512, to disable or enable the first resonance coil. It should be noted that, when a charged load is charged, a first resonance coil most corresponding to a location of the charged load may be enabled. In this case, the first resonance coil most corresponding to the location of the charged load may be a first resonance coil with a maximum power after the coil is enabled. Alternatively, any combination of two or more first resonance coils may be selected and enabled. In this case, the first resonance coil with the maximum power after being enabled may be selected. In addition, any combination of first resonance coils with a maximum power may be further enabled, to appropriately increase a charging power of the charged load.

Optionally, the first resonance coils 5072, 5073, and 5074 are respectively connected to resonant capacitors 5092, 5093, and 5094 in series or in parallel, and the excitation coil 505 is connected to a resonant capacitor 5091 in series or in parallel. The resonant capacitor can enable a resonance coil corresponding to the resonant capacitor to operate in a resonant state, thereby increasing a magnetic field transmission power. Specifically, resonance means that resonance occurs between an inductor and a capacitor at a resonance frequency. A coil is equivalent to an inductor. Four resonant capacitors 5091, 5092, 5093, and 5094 are respectively connected to the excitation coil 505 and the three first resonance coils 5072, 5073, and 5074 in series, so that the three first resonance coils resonate at a current frequency of the excitation coil.

It should be noted that in this embodiment shown in FIG. 5, the second resonance coil 506 is physically connected to the three first resonance coils 5072, 5073, and 5074, and the resonant capacitor can be shared. In another possible case, the second resonance coil 506 may also be connected to a single resonant capacitor in series or in parallel.

It should be noted that, an example of one second resonance coil and three first resonance coils is shown in this embodiment of FIG. 5, but a quantity of first resonance coils is not limited to three provided that the quantity can be more than or equal to three. For example, there may be four first resonance coils. In this case, an arrangement angle thereof is correspondingly adjusted, for example, may be an included angle of 90 degrees between any two adjacent first resonance coils. Alternatively, the first resonance coils may be arranged in another direction. An example of another different quantity of first resonance coils may be obtained by analogy based on the descriptions of the two embodiments that have been provided, and details are not described herein again.

Figure 8A:
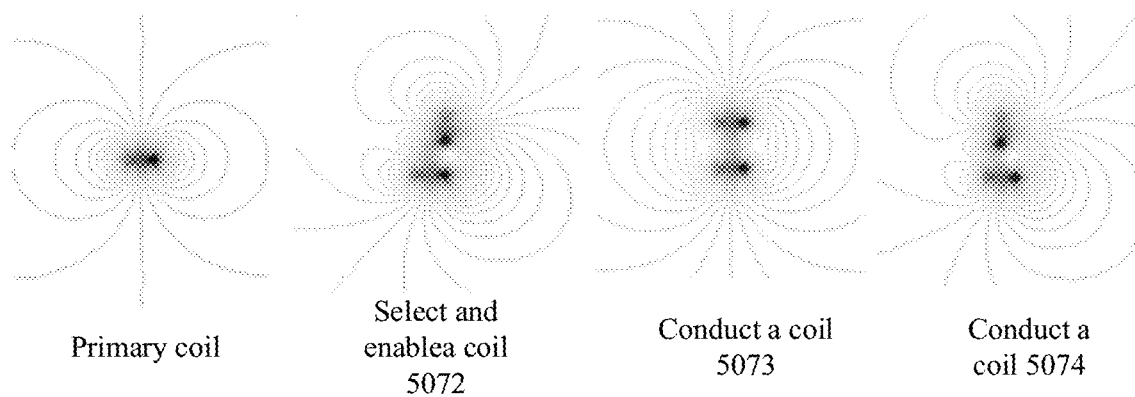
FIG. 8A is a beneficial effect drawing B according to embodiments of this application.

FIG. 8A shows a simulation result of a magnetic field distribution status on a transmit side in this embodiment. It can be learned that a magnetic field intensity is relatively large after the first resonance coils 5072, 5073, and 5074 are separately enabled, and magnetic field distribution in different directions can be implemented by enabling the first resonance coils at different locations, to implement omnidirectional wireless charging, further increase a coupling coefficient, increase a transmission power, and further enhance energy of the magnetic field generated by the coil on the transmit side. It is verified through simulation analysis that a magnetic field intensity of a magnetic field at a location of the device is greatly increased by enabling a corresponding coil when it is compared with a case in which a coil is not provided.

Figure 6:
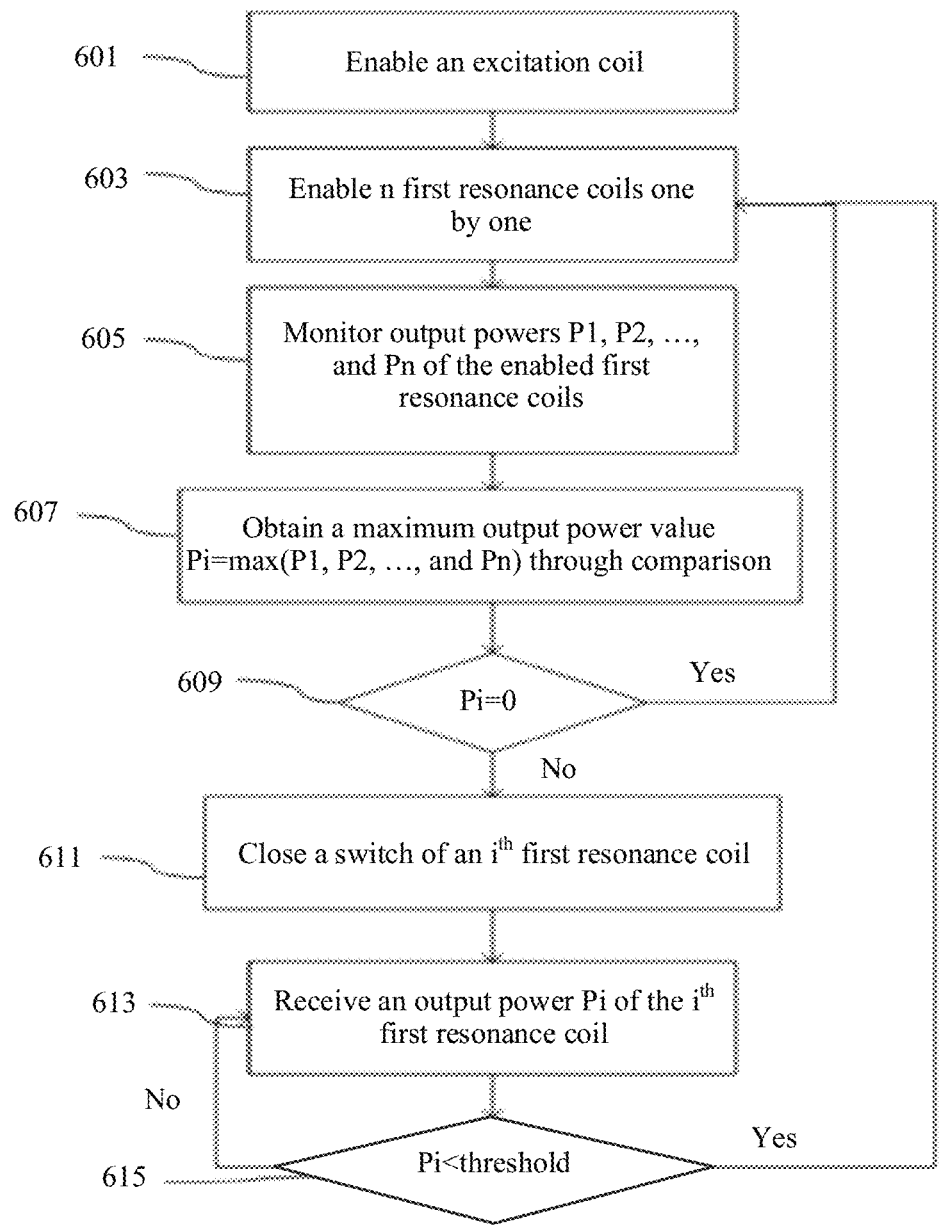
FIG. 6 is a flowchart A of a possible wireless charging method according to embodiments of this application.

Another embodiment of this application provides a wireless charging method. As shown in FIG. 6, the method specifically includes the following steps:

Step 601: Conduct an excitation coil. Specifically, after power is supplied, the excitation coil receives a high-frequency alternating current voltage from a basic circuit, and generates a magnetic field according to the law of electromagnetic induction. For example, the basic circuit performs voltage step down processing on a 220V/50 Hz power grid voltage, converts, into a direct current voltage, an alternating current voltage obtained after the voltage step down processing, and then converts the direct current voltage into the high-frequency alternating current voltage to be supplied to the excitation coil. A frequency of the high-frequency alternating current voltage herein is usually between several dozens of kHz and several MHz, for example, 100 kHz and an ISM frequency band of 6.765 MHz to 6.795 MHz. However, this is not limited to this frequency.

Step 603: Enable n first resonance coils one by one. Specifically, after a resonance coil receives a switch close instruction sent by a controller, a switch is closed and the coil is enabled. The magnetic field generated by the excitation coil is conducted by the enabled coil.

Step 605: Compare powers of the enabled first resonance coils one by one. Specifically, after steps 601 and 603 are performed, the excitation coil generates the magnetic field, the resonance coils conduct the magnetic field, and the magnetic field radiates into air. After capturing the magnetic field, a receive side coil generates an electric potential difference, obtains power data, and transmits the power data to the controller on a transmit side in a wireless communication manner. The controller on the transmit side receives power values P1, P2, P3, . . . , and Pn for the conducted resonance coils.

Steps 607 and 609: Select a first resonance coil with a maximum power that is not equal to "0". Specifically, after obtaining the power values P1, P2, P3, . . . , and Pn for the first resonance coils, the controller on the transmit side performs a comparison operation to determine a maximum power Pi=Max(P1, P2, P3, . . . , and Pn). When Pi is not equal to "0", it indicates that the load enters a charging area, and step 611 continues to be performed, to enable a selected ith resonance coil. When Pi is equal to "0", it indicates that no load enters the charging area, and step 603 is returned, to continue to enable the first resonance coils one by one.

Step 611: Close a switch of the selected ith resonance coil, in other words, enable the selected ith resonance coil. Specifically, after determining the ith resonance coil with the maximum power, the controller on the transmit side sends an instruction for closing the switch of the ith resonance coil. In other words, enabling of the ith resonance coil is completed, to start to charge the charged load at a corresponding location.

Step 613: Optionally, a power status of the ith resonance coil in an enabled state is received. Specifically, the controller on the transmit side receives periodically or in real time a power of the ith resonance coil that has been enabled. A specific receiving method is as follows: The first resonance coils conduct the magnetic field, and the magnetic field radiates into the air. After capturing the magnetic field, the receive side coil generates the electric potential difference, obtains the power data, and transmits the power data to the controller on the transmit side in the wireless communication manner. The controller on the transmit side receives a real-time power Pi of the first resonance coil.

Step 615: Optionally, the power of the first resonance coil in the enabled state that is lower than or equal to a threshold is received. Specifically, the real-time power Pi of the first resonance coil is obtained according to step 613. When Pi is lower than or equal to the threshold, it indicates that the load that is being charged moves, causing a sudden change in an output power, and the enabled resonance coil needs to be adjusted. Optionally, the threshold may be 0.8 times the maximum power according to steps 607 and 609. It should be noted that the threshold needs to be determined based on a specific charged load. This includes but is not limited to the following example. For example, for an iPhone, when a power required for charging is 10 W, if it is detected that the power suddenly drops to 8 W, it indicates that the mobile phone moves, and a location after the movement is relatively far from the first resonance coil in the enabled state. In this case, there may be another first resonance coil whose output power is greater than 8 W. Therefore, step 603 to step 611 need to be performed again, the first resonance coils are enabled again one by one, and the first resonance coil with the maximum power that is not equal to "0" is selected and enabled. It should be noted that there is further a case in which the power of the first resonance coil in the enabled state is lower than the threshold. For example, for an iPhone, when a power required for charging is 10 W, if it is detected that the power suddenly drops to 7 W, it indicates that the mobile phone moves, and a location after the movement is relatively far from the resonance coil in the enabled state. In this case, there may be another first resonance coil whose output power is greater than 7 W. Therefore, step 603 to step 611 need to be performed again, the first resonance coils are enabled again one by one, and the first resonance coil with the maximum power that is not equal to "0" is selected and enabled.

Step 617: Optionally, the enabled first resonance coil whose power is determined to be lower than the threshold in step 615 is disabled. Specifically, the controller on the transmit side sends an instruction for opening an enabling switch, that is, disables the enabled first resonance coil.

Figure 7:
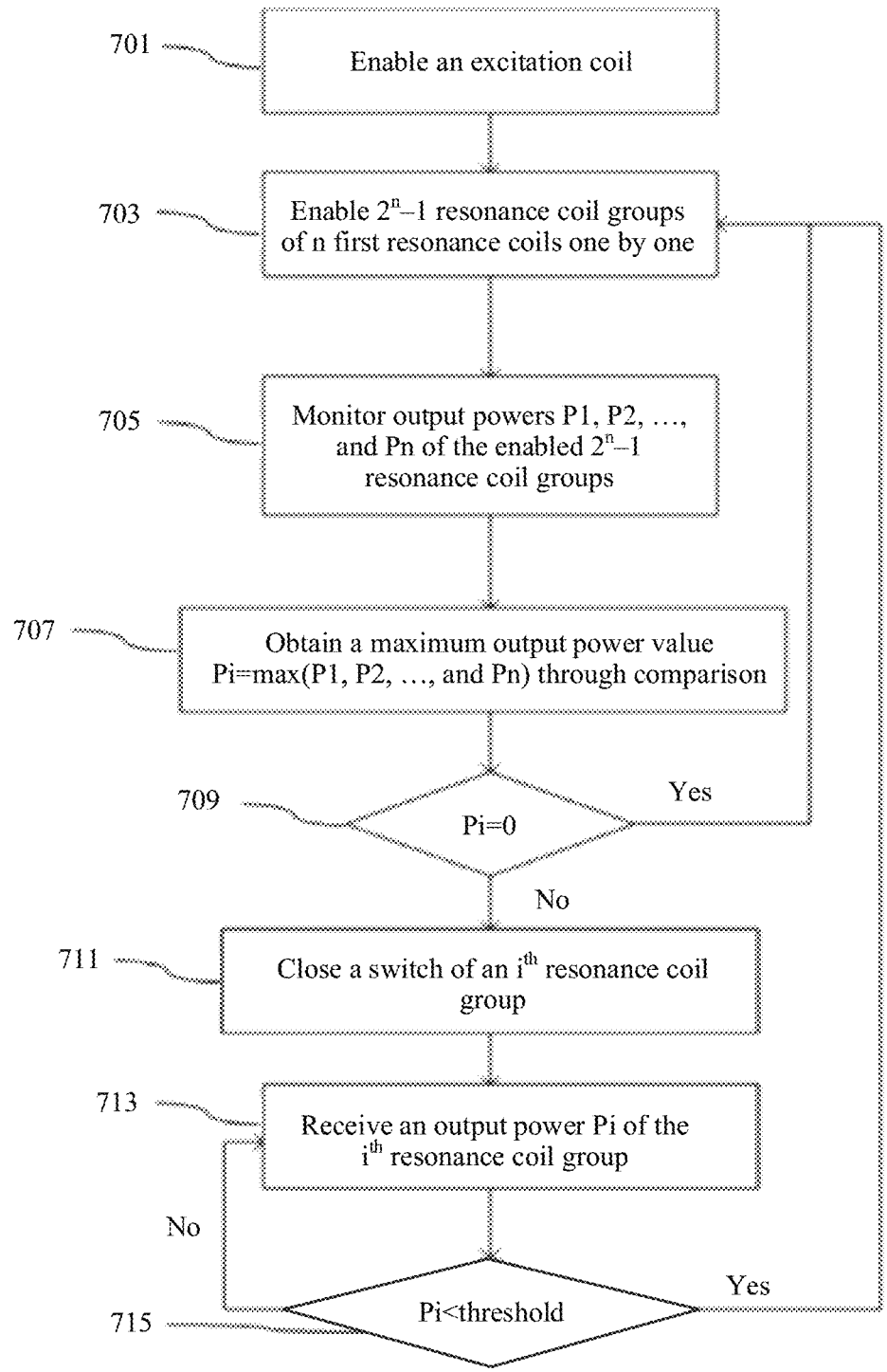
FIG. 7 is a flowchart B of a possible wireless charging method according to embodiments of this application.

Another embodiment of this application provides a wireless charging method. As shown in FIG. 7, the method specifically includes the following steps:

Step 701: Enable an excitation coil. Specifically, after power is supplied, the excitation coil receives a high-frequency alternating current voltage from a basic circuit, and generates a magnetic field according to the law of electromagnetic induction. This step is the same as step 601 in the foregoing embodiment, and details are not described herein again.

Step 703: Enable 2n−1 resonance coil groups of n first resonance coils one by one. The 2n−1 resonance coil groups are formed by the n first resonance coils in a manner of a single coil or a combination of a plurality of first resonance coils. Specifically, n is a quantity of first resonance coils, and a quantity of any combinations of the n first resonance coils based on one or more first resonance coils is 2n−1. For example, when n=3, there is a total of 23-1 of all combination modes of three first resonance coils A, B, and C that are enabled one by one, that is, seven combination modes: A, B, C, AB, BC, AC, and ABC.

Step 705: Compare powers of the 2n−1 resonance coil groups after being enabled one by one. Specifically, after steps 701 and 703 are performed, the excitation coil generates the magnetic field, the resonance coils conduct the magnetic field, and the magnetic field radiates into air. After capturing the magnetic field, a receive side coil generates an electric potential difference, obtains power data, and transmits the power data to a controller on a transmit side in a wireless communication manner. The controller on the transmit side receives power values P1, P2, P3, . . . , and Pn for the enabled resonance coil groups. For example, when n=3, the seven combination modes for enabling the first resonance coils A, B, and C are A, B, C, AB, BC, AC, and ABC, and seven powers P1, P2, P3, P4, P5, P6, and P7 can be obtained.

Steps 707 and 709: Select a resonance coil group with a maximum power that is not equal to "0". Specifically, after obtaining the power values P1, P2, P3, . . . , and Pn for the resonance coil groups, the controller on the transmit side performs a comparison operation to determine a maximum power Pi=Max(P1, P2, P3, . . . , and Pn). When Pi is not equal to "0", it indicates that the load enters a charging area, and step 711 continues to be performed, to enable a selected ith resonance coil group. When Pi is equal to "0", it indicates that no load enters the charging area, and step 703 is returned, to continue to enable combinations of the resonance coils one by one. Specifically, for example, when n=3, after the comparison operation, the controller determines that P4 is the maximum power and P4 is not equal to "0", and any combination of first resonance coils that corresponds to P4 is AB. It should be noted that, in a possible case, due to a magnetic field superposition effect, a larger power is obtained by conducting the resonance coil group than conducting a single first resonance coil. In another possible case, mutual cancellation occurs on magnetic fields generated by first resonance coils in the resonance coil group, and in this case, an effect obtained by using the resonance coil group is not as good as that obtained by using the single first resonance coil. In a general case, both magnetic field superposition and cancellation are considered in this embodiment. Herein, n=3 is used as an example. It is assumed that magnetic fields generated by A and B are superimposed at a device, and magnetic fields generated by A and C are cancelled at the device. In this case, a possible power comparison result is that P4 is the largest and P5 is the smallest. In this manner, more combination opportunities are increased, and a resonance coil group with a maximum output power is always selected.

Step 711: Close a switch of the selected ith resonance coil group, in other words, enable the selected ith resonance coil group. Specifically, after determining the ith resonance coil group with the maximum power, the controller on the transmit side sends an instruction for closing the switch of the ith resonance coil group. In other words, enabling of the ith resonance coil group is completed, to start to charge the charged load at a corresponding location. Specifically, for example, when the ith resonance coil group selected according to steps 707 and 709 is AB, switches of the first resonance coil A and the first resonance coil B are closed, and the first resonance coil A and the first resonance coil B are enabled.

Step 713: Optionally, a power status of the ith resonance coil group in an enabled state is received. Specifically, the controller on the transmit side receives periodically or in real time a power of the ith resonance coil group that has been enabled. A specific receiving method is as follows: The resonance coil group conducts the magnetic field, and the magnetic field radiates into the air. After capturing the magnetic field, the receive side coil generates the electric potential difference, obtains the power data, and transmits the power data to the controller on the transmit side in the wireless communication manner. The controller on the transmit side receives a real-time power Pi of the resonance coil group.

Step 715. Optionally, the power of the ith resonance coil group in the enabled state that is lower than a threshold is received. Specifically, the real-time power Pi of the resonance coil group is obtained according to step 713. When Pi is lower than the threshold, it indicates that the load that is being charged moves, causing a sudden change in an output power, and the enabled first resonance coil group needs to be adjusted. Optionally, the threshold may be 0.8 times the maximum power according to steps 707 and 709. It should be noted that the threshold needs to be determined based on a specific charged load. Specifically, details are the same as the example of step 615 in the foregoing embodiment, and are not described herein again.

Step 717. Optionally, the enabled resonance coil group whose power is determined to be lower than the threshold in step 715 is disabled. Specifically, the controller on the transmit side sends an instruction for opening an enabling switch, that is, disables the enabled resonance coil group.

Optionally, in an optional implementation of the foregoing two method embodiments, a second resonance coil is added. The second resonance coil is in an enabled state, and resonates with the first resonance coil under excitation of the excitation coil, to enhance magnetic field propagation efficiency. In this implementation, other method steps are the same as those in the foregoing two method embodiments.

What is claimed is:

1. A wireless charging apparatus comprising a voltage conversion circuit, an excitation coil, n resonance coils, and a controller, wherein n is an integer greater than or equal to 3, wherein
   the voltage conversion circuit is connected to the excitation coil and is configured to convert a power grid voltage into a high-frequency alternating current voltage;
   the excitation coil is configured to generate a magnetic field based on the high-frequency alternating current voltage;
   the n resonance coils are arranged in different directions and are configured to conduct the magnetic field; and
   the controller is configured to monitor power statuses of the n resonance coils, and enable or disable the n resonance coils based on the power statuses.

2. The wireless charging apparatus according to claim 1, wherein each one of the n resonance coils and the excitation coil combine with a resonant capacitor that makes each resonance coil resonate with the excitation coil.

3. The wireless charging apparatus according to claim 1, wherein each resonance coil is located on a path of the magnetic field generated by the excitation coil.

4. The wireless charging apparatus according to claim 1, wherein n is 3, and a plane of any resonance coil is arranged at an included angle of 120 degrees to a plane of another resonance coil adjacent to the any resonance coil.

5. The wireless charging apparatus according to claim 1, wherein the controller is further configured to:
   obtain powers of the n resonance coils after the n resonance coils are enabled;
   compare powers of the enabled n resonance coils;
   select, as a first resonance coil that needs to be enabled, one of the n resonance
   coils with a maximum power that is not equal to "0"; and
   send an enabling instruction to the first resonance coil that needs to be enabled.

6. The wireless charging apparatus according to claim 1, wherein the n first resonance coils form 2n−1 resonance coil groups in a manner of a single coil or a combination of a plurality of first resonance coils, and the controller is further configured to:
   obtain powers of the first resonance coils after the 2n−1 resonance coil groups are enabled;
   compare powers of the resonance coil groups;
   select, as a resonance coil group that needs to be enabled, a resonance coil group with a maximum power that is not equal to "0"; and
   send an enabling instruction to the resonance coil group that needs to be enabled.

7. The wireless charging apparatus according to claim 1, wherein the n resonance coils comprise first and a second resonance coils, wherein
   the second resonance coil is in an enabled state and fully coupled to the excitation coil, and is connected to the first resonance coil; and
   the first resonance coil is weakly coupled to or uncoupled from the second resonance coil.

8. The wireless charging apparatus according to claim 1, wherein n is 5, a first resonance coil of the n resonant coils is parallel to a plane of the excitation coil, any one of another four resonance coils is arranged at an included angle of 90 degrees to the first resonance coil, and the first resonance coil is adjacent to the any one of the other four resonance coils.

9. The wireless charging apparatus according to claim 5, wherein the controller is further configured to:
   send a disabling instruction to the first resonance coil in response to determining that a power of the first resonance coil in the enabled state is lower than or equal to a threshold.

10. The wireless charging apparatus according to claim 2, wherein each resonance coil is located on a path of the magnetic field generated by the excitation coil.

11. The wireless charging apparatus according to claim 2, wherein n is 3, and a plane of a first resonance coil of the n resonant coils is arranged at an included angle of 120 degrees to a plane of another resonance coil adjacent to the first resonance coil.

12. The wireless charging apparatus according to claim 2, wherein the controller is further configured to:
   obtain powers of the resonance coils after the resonance coils are enabled;
   compare powers of the enabled resonance coils;
   select, as a first resonance coil that needs to be enabled, a resonance coil with a maximum power that is not equal to "0"; and
   send an enabling instruction to the first resonance coil that needs to be enabled.

13. The wireless charging apparatus according to claim 2, wherein the n resonance coils form 2n−1 resonance coil groups in a manner of a single coil or a combination of a plurality of resonance coils, and the controller is further configured to:
   obtain powers of the resonance coils after the 2n−1 resonance coil groups are enabled;
   compare powers of the resonance coil groups;
   select, as a resonance coil group that needs to be enabled, a resonance coil group with a maximum power that is not equal to "0"; and
   send an enabling instruction to the resonance coil group that needs to be enabled.

14. The wireless charging apparatus according to claim 2, wherein the n resonance coils comprise first and second resonance coils, wherein the second resonance coil is in an enabled state and fully coupled to the excitation coil, and is connected to the first resonance coil; and the first resonance coil is weakly coupled to or uncoupled from the second resonance coil.

15. The wireless charging apparatus according to claim 2, wherein n is 5, a first resonance coil of the n resonant coils is parallel to a plane of the excitation coil, any one of another four resonance coils is arranged at an included angle of 90 degrees to the first resonance coil, and the first resonance coil is adjacent to the any one of the other four resonance coils.

16. A wireless charging method, applied to a wireless charging apparatus, wherein the wireless charging apparatus comprises a voltage conversion circuit, an excitation coil, n resonance coils, and a controller, the voltage conversion circuit is connected to the excitation coil, the n resonance coils are arranged in different directions, n is an integer greater than or equal to 3, and the method comprises:

converting, by the voltage conversion circuit, a power grid voltage into a high-frequency alternating current voltage;

generating, by the excitation coil, a magnetic field based on the high-frequency alternating current voltage;

conducting, by the resonance coils, the magnetic field; and monitoring, by the controller, power statuses of the resonance coils, and enabling or disabling the resonance coils based on the power statuses.

17. The wireless charging method according to claim 16, wherein monitoring the power statuses of the resonance coils and controlling enabling or disabling of the resonance coils based on the power statuses comprises:

obtaining powers of the resonance coils after the resonance coils are enabled;

comparing powers of the enabled resonance coils; and selecting and enabling a resonance coil with a maximum power that is not equal to "0".

18. The wireless charging method according to claim 16, wherein the n resonance coils form 2n−1 resonance coil groups in a manner of a single coil or a combination of a plurality of resonance coils; and wherein monitoring the power statuses of the resonance coils and controlling enabling or disabling of the resonance coils based on the power statuses comprises:

obtaining powers of the resonance coils after the 2n−1 resonance coil groups are enabled;

comparing powers of the resonance coil groups; and selecting and enabling a resonance coil group with a maximum power that is not equal to "0".

19. The wireless charging method according to claim 17, further comprising:

receiving a power of a first resonance coil of the n resonance coils in an enabled state; and disabling the first resonance coil in the enabled state in response to the power of the first resonance coil in the enabled state being lower than or equal to a threshold.

20. The wireless charging method according to claim 18, further comprising:

receiving a power of a first resonance coil of the n resonance coils in an enabled state; and disabling the first resonance coil in the enabled state in response to the power of the first resonance coil in the enabled state being lower than or equal to a threshold.

* * * * *

UNITED STATES PATENT AND TRADEMARK OFFICE
CERTIFICATE OF CORRECTION

| | | |
|---|---|---|
| PATENT NO. | : 11,923,690 B2 | |
| APPLICATION NO. | : 16/951883 | |
| DATED | : March 5, 2024 | |
| INVENTOR(S) | : Chen et al. | |

It is certified that error appears in the above-identified patent and that said Letters Patent is hereby corrected as shown below:

In the Claims

Claim 6: Column 16, Line 4: "first" should be deleted.

Claim 6: Column 16, Line 6: "first" should be deleted.

Claim 6: Column 16, Line 8: "first" should be deleted.

Claim 7: Column 16, Line 17: "a" should be deleted.

Signed and Sealed this
Twenty-fifth Day of June, 2024

*Katherine Kelly Vidal*

Katherine Kelly Vidal
*Director of the United States Patent and Trademark Office*